April 9, 1968
L. E. EATON ETAL
3,376,831
HYDRAULICALLY DAMPENED CAR BOGIE
Filed April 27, 1965
5 Sheets-Sheet 1
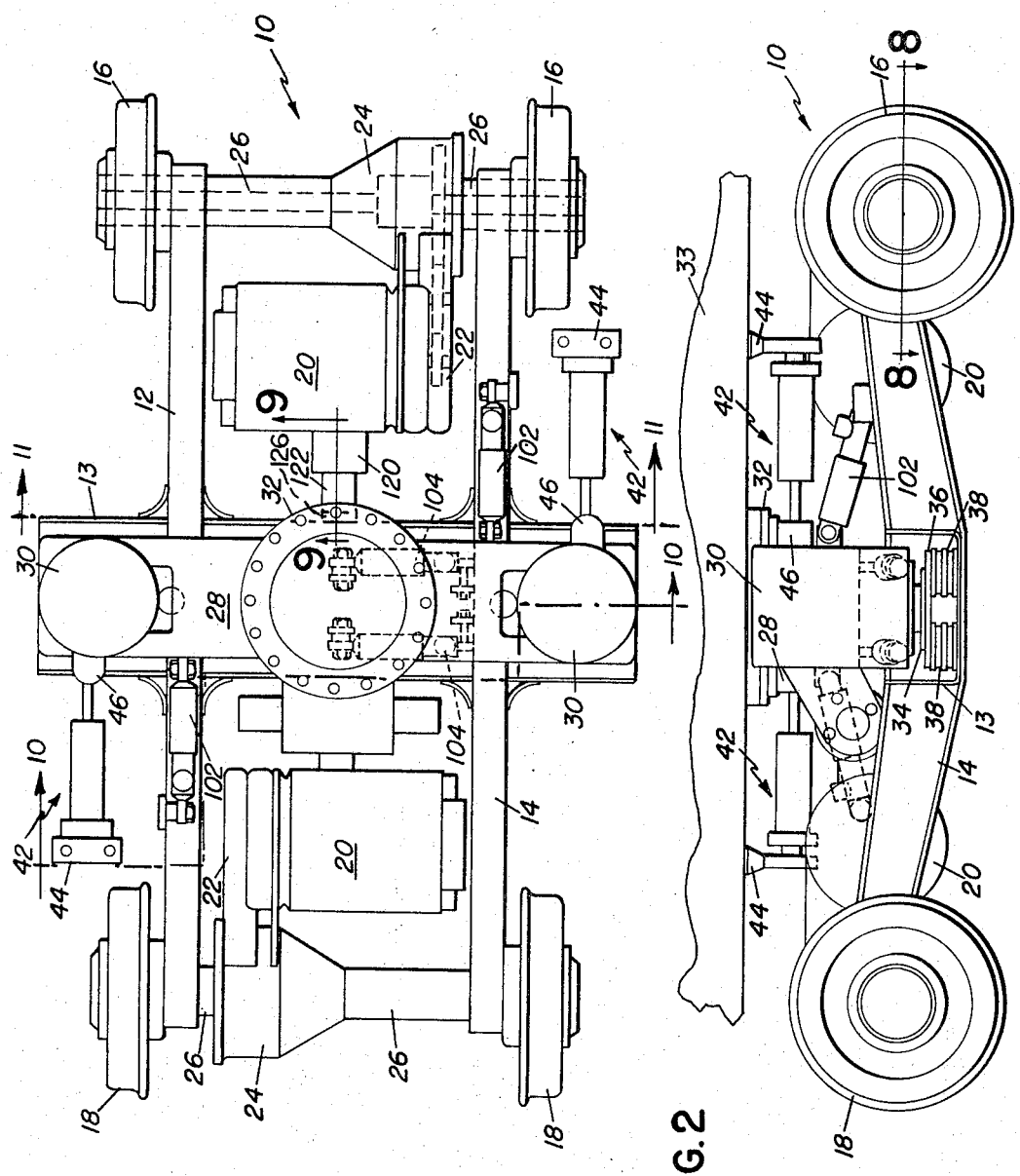
INVENTORS
JOHN H. HYLER
WAYNE H. McGLADE
LYLE E. EATON
WILLIAM H. HOERR
BY
RONALD C. KAMP ATTORNEY

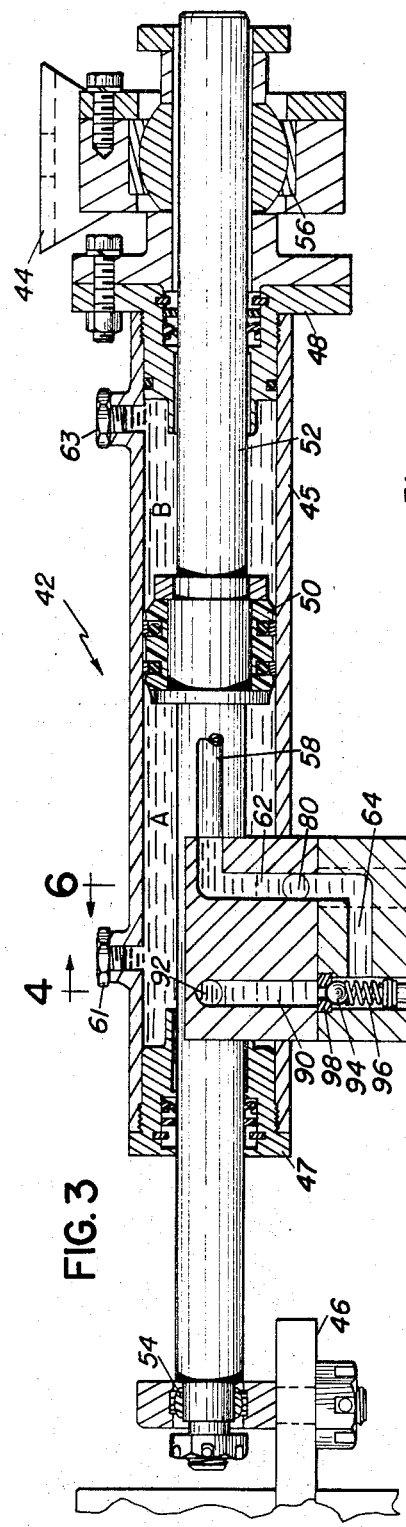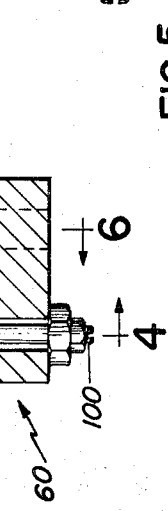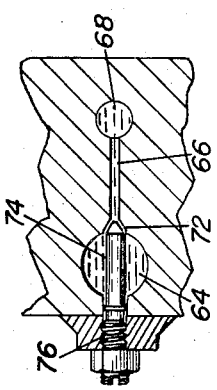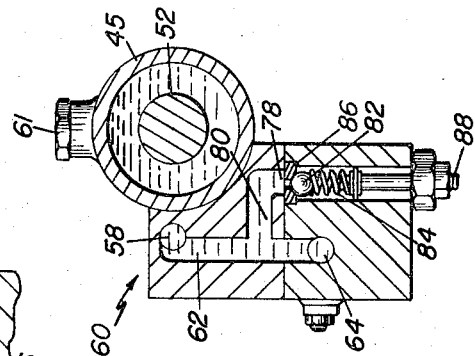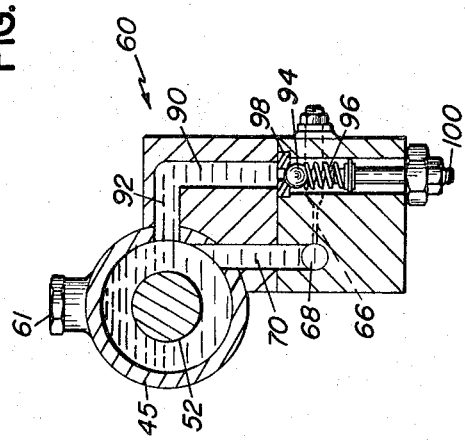
FIG. 3  FIG. 4  FIG. 5  FIG. 6
INVENTORS
JOHN H. HYLER
WAYNE H. McGLADE
LYLE E. EATON
WILLIAM H. HOERR
BY
RONALD C. KAMP  ATTORNEY April 9, 1968     L. E. EATON ETAL     3,376,831
HYDRAULICALLY DAMPENED CAR BOGIE
Filed April 27, 1965     5 Sheets-Sheet 3
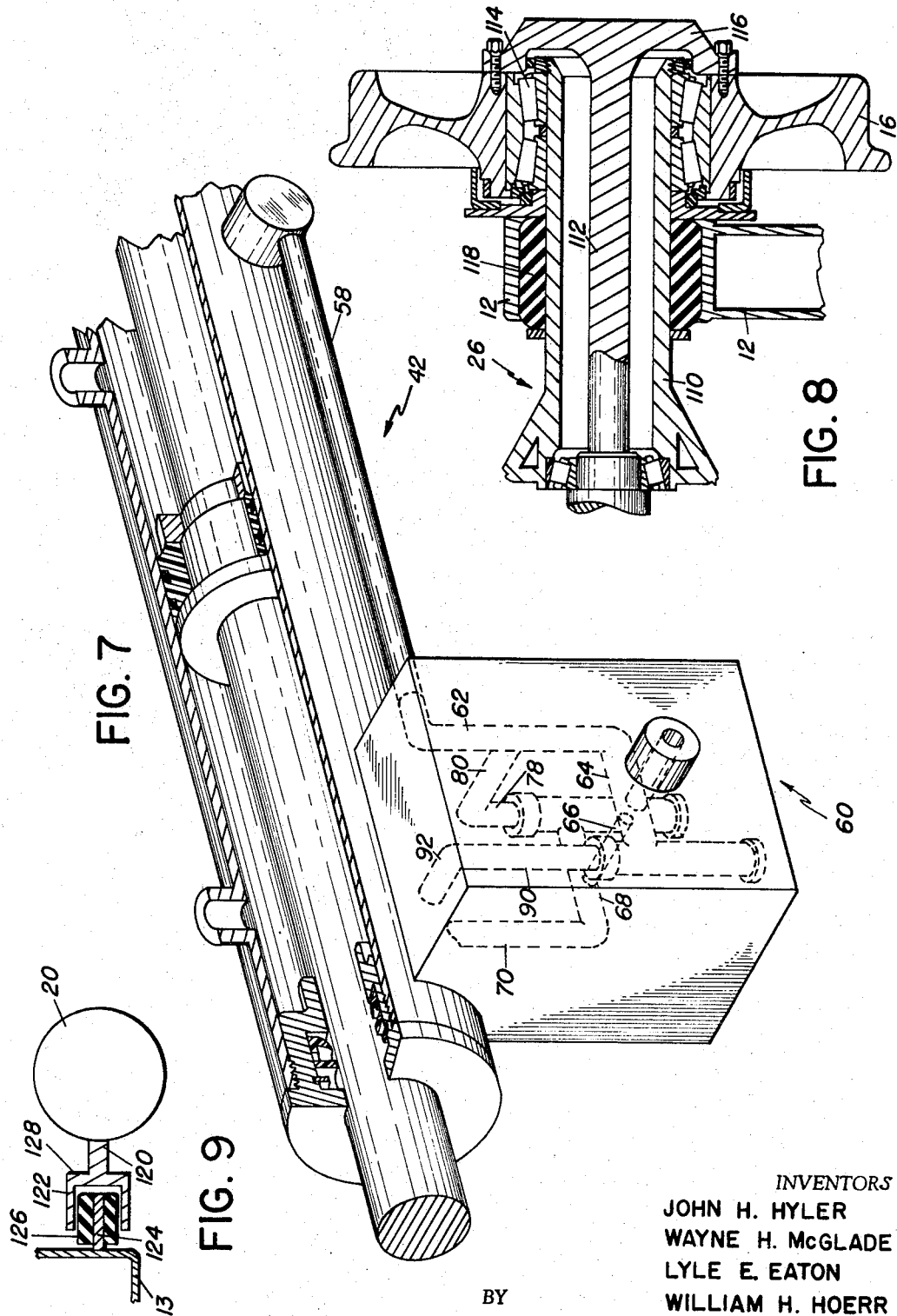
INVENTORS
JOHN H. HYLER
WAYNE H. McGLADE
LYLE E. EATON
WILLIAM H. HOERR
BY
RONALD C. KAMP ATTORNEY

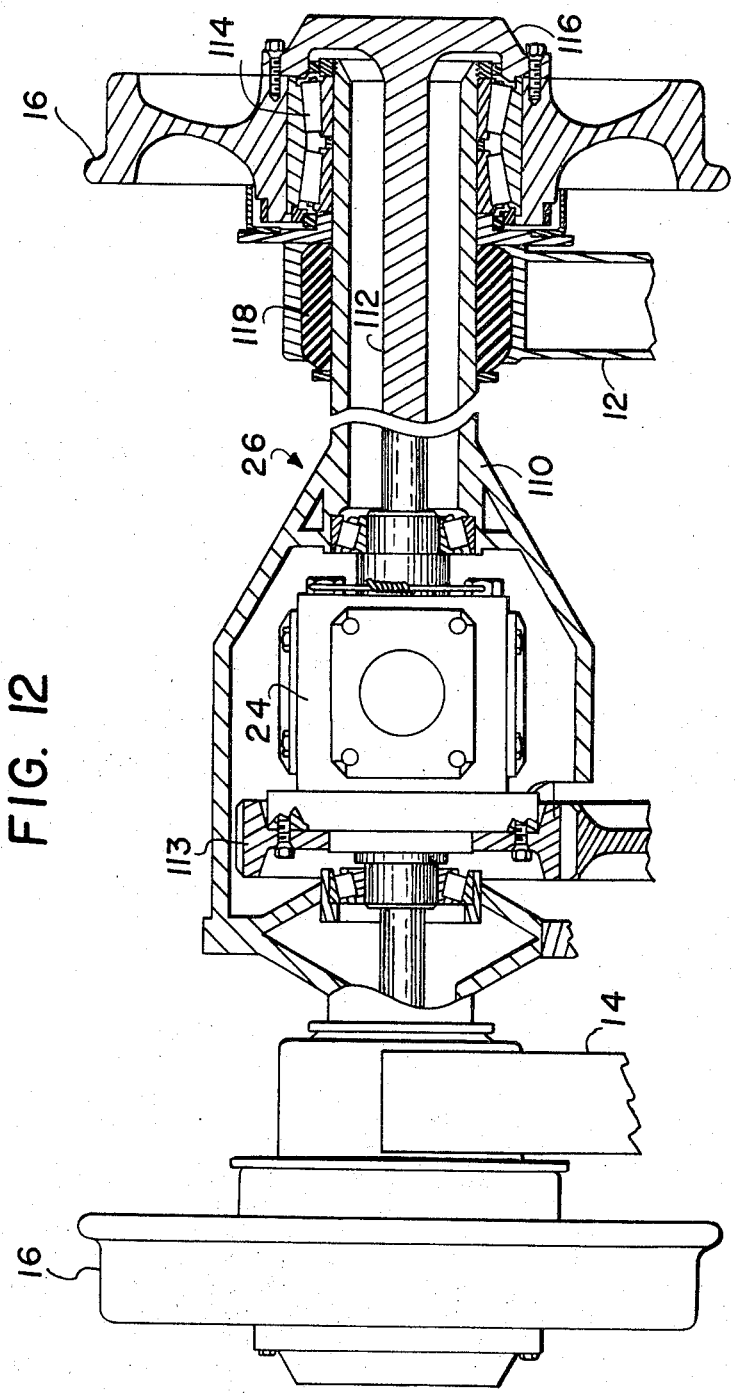

United States Patent Office 3,376,831
Patented Apr. 9, 1968

3,376,831
HYDRAULICALLY DAMPENED CAR BOGIE
Lyle E. Eaton, Pekin, William H. Hoerr, Peoria Heights, and John H. Hyler and Wayne H. McGlade, Peoria, Ill., assignors to Westinghouse Air Brake Company, a corporation of Pennsylvania
Filed Apr. 27, 1965, Ser. No. 451,173
5 Claims. (Cl. 105—199)

ABSTRACT OF THE DISCLOSURE

A suspension system for damping movement of a rail vehicle, the vehicle including a bolster connecting a vehicle body to a rail truck for pivotal movement about a vertical axis. Resilient means connect the bolster and truck for limited longitudinal and transverse movement and first, second and third viscous damping means are provided for damping movement of the body about vertical, longitudinal and transverse axes. Further cushioning means are provided to insulate the body and truck against vibration.

Figure 11:
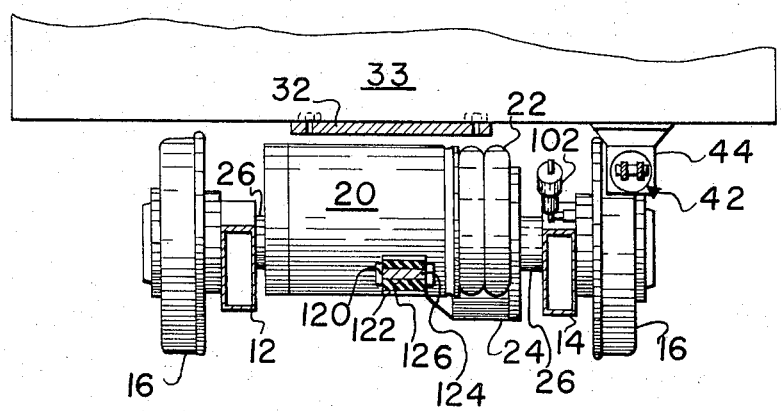

The present invention relates to damping systems for rail vehicles generally, and more particularly, to damping systems for use in rail vehicles capable of traveling at high speeds.

The problems encountered in modern high speed rail vehicles are more complex than those normally associated with rail vehicles in the past, and are aggravated by the comparatively light weight of such vehicles. One of the more troublesome problems is "hunting," i.e., the tendency of the truck to swing from side to side as it progresses along the track. "Hunting" may be induced in a variety of ways, e.g., the axles not being parallel, but one of the most common causes, especially when the vehicle is light weight and traveling at high speed, is a cross wind. Such a wind, blowing transverse to the path of the vehicle, imposes a side load on the vehicle and the truck. The wheels on the truck have a slightly tapered or conical surface, which provides an increased diameter adjacent the flange. A cross wind displaces the truck and causes the wheels on the leeward side of the vehicle to rotate on a diameter which is greater than that of the wheels on the windward side. If both wheels, i.e., windward and leeward, are rotating the same number of revolutions per minute, the leeward wheel will travel a slightly greater distance in a given time interval. This will cause the truck to pivot about a vertical axis toward the windward side, decreasing the effective rolling diameter of the leeward wheel and increasing the diameter of the windward wheel. The inertia of the truck will carry it past the equilibrium condition of equal wheel diameters and the wind force will then cause the cycle to be repeated. As a result the truck, instead of traveling a straight path, will swing from side to side within the limits permitted by the flanges, hunting for a position of equilibrium. This characteristic creates an unstable and potential dangerous condition, especially when the vehicle is light weight and traveling at high speeds.

Another problem of high speed vehicles is the fore and aft oscillation of the body portion relative to the truck occasioned by acceleration and deceleration of the vehicle. It is desirable from the standpoint of passenger comfort to allow the body portion to yield in response to these acceleration forces, but to provide damping so that oscillation or rebound, especially when braking, is minimized.

It is, therefore, an object of this invention to provide a truck for a rail vehicle which is stable and capable of traveling at high speeds.

It is another object of this invention to provide a truck for a rail vehicle which will permit the body to yield relative to the truck and which will resist small oscillations about a vertical axis, as well as dampen oscillations about transverse and longitudinal axes.

Figure 10:
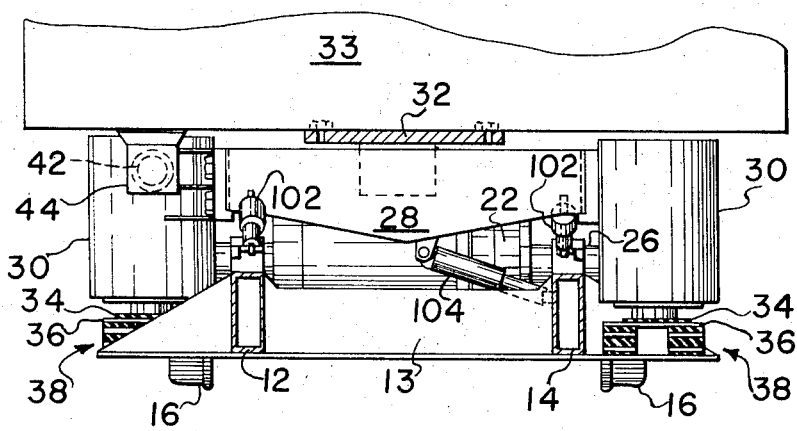

These and other objects and many of the attendant advantages will become more readily apparent from a perusal of the following description and the accompanying drawing wherein:

FIG. 1 is a top plan view of a truck embodying the present invention;
FIG. 2 is a side elevational view of the truck shown in FIG. 1;
FIG. 3 is a longitudinal cross-sectional view of a preferred embodiment of a damping cylinder;
FIG. 4 is a cross-sectional view taken on line 4—4 of FIG. 3;
FIG. 5 is a cross-sectional view, with portions broken away, taken on a plane transverse to the longitudinal axis of the cylinder through the valve block, and showing the needle valve;
FIG. 6 is a cross-sectional view taken on line 6—6 of FIG. 3;
FIG. 7 is an isometric view of a damping cylinder;
FIG. 8 is a cross-sectional view taken on line 8—8 of FIG. 2;
FIG. 9 is a cross-sectional view taken on line 9—9 of FIG. 1;
FIG. 10 is a view in cross-section on line 10—10 of FIG. 1;
FIG. 11 is a view in cross-section on line 11—11 of FIG. 1; and
FIG. 12 is a view similar to that shown in FIG. 8 but on a larger scale and setting forth the complete axle.

In the illustrated embodiment of the invention, a truck, indicated generally at 10, a rail vehicle consists basically of a pair of side frames 12 and 14 secured to a cross member 13. Two pair or sets of wheels 16 and 18 are rotatably mounted on the side frames. Each set of wheels is driven by a power source 20, as shown by McGlade, Patent No. 3,244,116, by means of a gear reduction box 22 including a plurality of gears driving a differential 24 connected to a split axle 26 (FIGURE 8), the latter of which is drivingly connected to the wheels. A bolster 28 is supported above and transverse to the side frames by a pair of oleo-pneumatic suspension units 30, which may be similar to that disclosed by Eaton et al. in application Ser. No. 422,715 filed Dec. 31, 1964, now Patent No. 3,304,077, issued Feb. 14, 1967, resting on the cross member 13. The suspension units 30 are positioned adjacent and fixedly secured to the outer ends of the bolster 28 in any suitable manner to provide maximum stability for the bolster relative to the frames. A circular plate 32 is rotatably mounted on the bolster, and is adapted for attachment to the body portion 33 of the vehicle which permits relative rotation between the body portion 33 and the truck 10 about a vertical axis through the center of the bolster 28. The piston or rod portion of each suspension unit 30 rests upon a pad 34 of any suitable resilient substance such as rubber and is attached to a metal plate 36 by fasteners which extend through the pad 34. The pad 34 serves to isolate the body portion of the vehicle from high frequency small amplitude vibrations induced in the truck. The metal plate 36 is attached to and supported on the side frame by four stacks or laminations 38 of alternating layers of metal and resilient material, one stack being positioned at each corner of the plate 36. This stack 38 permits the bolster 28, and hence the vehicle body portion 33, to shift a limited amount with respect to the truck 10. Although such movement is restricted, it is sufficient to take the peak off, i.e., smooth out the acceleration forces encountered in starting and stopping, and in sudden changes in direction, as for example negotiating a curve at high speed.

Referring first to the dissipation of oscillations about a vertical axis, i.e., the prevention of hunting, there is shown in FIGS. 3-7, a preferred embodiment of a damping jack 42, which is connected between the body portion 33 and the bolster 28, at 44 and 46 respectively. This damping jack has a cylinder 45 with a suitably packed piston 50 reciprocably retained therein. A rod 52 is secured to the piston 50 and extends through appropriately sealed caps 27 and 48 attached to the ends of cylinder 45. The rod 52 has a length sufficient to extend completely through cylinder 45 in all positions of the piston 50, thereby providing equal volume displacements for given movements of the piston in either direction. The rod 52 is attached to the bolster at 46 by means of a universal connector 54 and cylinder 45 is connected to the body portion 33 at 44 by means of another universal connection 56. Such a mounting permits jack 42 to maintain proper alignment and to function without binding as the body portion moves relative to the truck.

The piston 50 divides cylinder 45 into two compartments or chamber A and B, which are connected in fluid communication by means of a conduit 58 and a valve block 60. The chambers A and B are both completely filled with a non-compressible, i.e., virtually incompressible, fluid through filler plugs 61 and 63. For a better understanding of the valve block 60, the various passages contained therein will be referred to by characteristics of their orientation as shown in the drawing, although it is to be understood that their actual orientation in use is not critical. The conduit 58 has one end in direct fluid communication with chamber B and has the other end in communication with a vertical passage 62 in valve block 60. Vertical passage 62 is connected with a horizontal passage 64. A common horizontal cross-passage 66 connects horizontal passage 64 with another horizontal passage 68, which connects with a vertical passage 70 terminating in and communicating with the chamber A of the jack 42. A seat 72 is formed at the intersection of horizontal passage 64 with cross-passage 66 and is aligned with a needle valve 74 which is adjustably mounted by any suitable means, such as screw threads 76, in the valve block 60. The needle valve 74 is adjusted so that it permits a very slow rate of flow through cross-passage 66, and, of course, would function regardless of the direction of flow therethrough. Horizontal passage 68 is also connected with a vertical passage 78, which communicates with vertical passage 62 through a horizontal passage 80. A one-way ball check valve 82 is positioned within the vertical passage 78 and permits flow only from the horizontal passage 68. This check valve 82 will permit fluid flow in the above described direction only when the pressure exceeds a predetermined value. As shown here, a spring 84 is provided to force the ball valve 82 against its seat 86, and an adjustment means 88, of the type well known in the art, is provided to vary the spring force and hence the pressure at which the valve 82 will open. The horizontal passage 64 also communicates with a vertical passage 90, which passage in turn connects with a horizontal passage 92 terminating in and communicating with the chamber A. A second one-way check valve 94 is positioned in the vertical passage 90 and permits fluid flow only from the passage 90 into the horizontal passage 64. Valve 94 is also biased into closed position, as by a spring 96, and is held in this position against its seat 98 until a predetermined pressure is achieved, this pressure being selectively adjustable by adjustment means 100.

Referring now to FIGS. 8 and 12 it can be seen that the split axle consists basically of an axle housing 110 and a live axle portion 112, the two live axle portions being driven through the differential 24 by gear 113. The wheel 16 is rotatably mounted on the housing 110 by means of bearings 114 and is drivingly connected to the live axle portion through a connector element 116 formed on the end of the live axle portion. The axle housing 110 is carried on and isolated from the side frame 12 by a resilient pad or washer 118, which may be made of rubber. As best seen in FIG. 9, the power source 20 is provided with a torque reaction member 120 having a bifurcated fork 122 on its free end. The fork 122 brackets a pair of resilient pads 126 and 128 mounted on a support 124, which is secured to the cross member 13. The resilient pads are attached on each side of the support 124 to provide damping means, between the torque reaction member 120 and the cross member 13, in both directions, i.e., the power source may be capable of reversal in direction of rotation. Thus, it can be seen that all drive train components, i.e., the power source, the gear box, the axle and the wheels, are mounted on and isolated from the frame by resilient means thereby substantially reducing the transfer of vibrations from the drive train components to the body 33.

A pair of jacks 102, which may be similar to the jack 42 or if desired may be any one of the commercially available damping or shock absorbing jacks, is connected between the bolster 28 and the side frames 12 and 14. These jacks 102 serve to dampen or dissipate fore and aft movement of the bolster 28 relative to the side frames 12 and 14 when the vehicle is being stopped and started. Another pair of jacks 104, which are also damping jacks, are connected between the bolster and the frame and function to dampen or dissipate transverse or lateral movement of the bolster relative to the frame, such movement often being caused by negotiating a curve at high speeds.

*Operation*

Considering first the operation of the jacks 42, it should be noted that these jacks are connected between the bolster and the vehicle body. This is necessary because the circular plate 32 rotatably mounts the body on the bolster. Thus, as the body rotates relative to the bolster, as, for example, when the vehicle is going around a curve in the track, one jack will be extended and the other retracted. Such large degrees of rotation must be freely permitted to preclude derailment of the vehicle. However, the very small amount of relative rotation between the body and bolster produced by the hunting action must be resisted. On the other hand, the truck must be allowed to follow very gentle curves and must be permitted to respond to a transition section of track which precedes a curve, otherwise the truck will be held in the straight ahead position for a short interval and then snap into the curve, which action is itself objectionable. Thus, both chambers A and B, and all passages and conduits associated therewith, must be completely filled with a non-compressible fluid, such as oil. Assume that the piston 50 is now moved a short distance to the right, as viewed in FIGS. 3 and 7. A small amount of fluid will be displaced from chamber B and will be forced through the conduit 58 into the vertical passage 62 in the valve block 60. The displacement will have produced a pressure increase in the fluid in the chamber B, the conduit 58, and passages 62, 80 and 78, but since the displacement is small, the pressure rise will also be small. The spring 84 will cause the valve 82 to remain seated and the only avenue of escape for the fluid is through passages 62 and 64, around the needle valve 74, through cross-passage 66, horizontal passage 68, and vertical passage 70 into the chamber A. Fluid flow is, of course, not possible from horizontal passage 64 into vertical passage 90 because the check valve 94 will not permit flow in that direction. The needle valve 74 is adjusted relative to its seat 72 to permit flow therethrough, but at a very slow rate. If the distance the piston 50 moves or attempts to move to the right is large, the pressure in the fluid becomes high enough to unseat the valve 82 and flow of fluid is then through the passages 62, 80, 78, 68 and 70 into the chamber A, thereby permitting the piston to move freely in cylinder 45. When the piston 50 is moved a small distance to the left, as viewed in FIGS. 3 and 7, a restricted flow of fluid is permitted through the passages 70, 68, 66, 64 and 62 from chamber A to chamber B. As previously mentioned, a small displacement does not develop a pressure sufficient to unseat the valve 94. However, when the displacement becomes large, the valve 94 is unseated, and free flow of fluid through passages 92, 90, 64 and 62 is possible.

It is, therefore, apparent that the valve block 60 permits restricted and controlled flow in either direction, whenever the displacements of the piston 50 are small, between the needle valve 74 and its seat 72. Thus, for angular rotation between the body 33 and the bolster 28 amounting to but a few degrees, the movement of the piston 50 relative to cylinder 45 is restrained, but for rotation exceeding a few degrees, the piston 50 is free to move relative to cylinder 45. Hence, the rotational movement normally occasioned by the hunting action of the truck will be resisted, while the rotation necessary in negotiating a curve will be freely permitted.

The bolster 28, being supported on the suspension units 30, which are in turn supported by a laminated stack of rubber and metal plates, can move a limited amount laterally or fore and aft. Damping jacks 102 which are positioned parallel to the side frames and connected between these frames and the bolster resist such movement in the fore and aft directions and also dampen or dissipate the rebound after a slight shift of the bolster has occurred. Similarly, damping jacks 104 are positioned transverse to the longitudinal axis of the truck and are connected between the frame and the bolster. These jacks 104 resist lateral or side movement of the car body and dissipate any rebound. The combined function of these various jacks is to provide a suspension system for a high speed rail vehicle which provides a maximum of safety and comfort for the passengers and the cargo carried therein.

It is to be understood that all references herein to small and large displacements or to large or small degrees of rotation is with respect to time, e.g. a small displacement is intended to mean a small displacement per unit of time.

While there is in this application specifically described one form which the invention may assume in practice, it will be understood that this form of the same is shown for purposes of illustration and that the invention may be modified and embodied in various other forms without departing from its spirit or the scope of the appended claims.

What is claimed is:

1. In a rail vehicle including a body and a wheeled truck, said truck comprising:
   a wheeled frame,
   a transverse bolster connecting the body and the frame for rotational movement therebetween about a vertical axis,
   resilient means connecting said frame to said bolster permitting longitudinal and transverse movement therebetween,
   first viscous damper means secured to the body and said bolster for resisting small rotational movement therebetween about said vertical axis and freely permitting large rotational movement therebetween.
   second viscous damper means secured to said frame and said bolster for resisting fore and aft oscillation of the body,
   and third viscous damping means secured to said frame and said bolster for resisting transverse oscillation of the body.

2. In a rail vehicle according to claim 1 wherein said resilient means further comprises a laminated stack of rubber layers secured between said frame and said bolster.

3. In a rail vehicle according to claim 2 wherein said layers extend in a direction generally longitudinal of said frame.

4. In a rail vehicle according to claim 1 wherein said truck further comprises an axle housing resiliently supported on the frame, a drive axle rotatably mounted within said housing, rail-engaging wheels rotatably mounted on said housing and connected to the drive axle, a power source drivingly connected to the drive axle, a resilient pad mounted on the frame, and a torque reaction member connected to the power source and engageable with said pad, whereby the frame is isolated from vibrations.

5. In a rail vehicle according to claim 2, further including generally vertically extending fluid cylinder suspension means connected to said resilient means and secured between said frame and said bolster.

References Cited

UNITED STATES PATENTS

| | | | |
|---|---|---|---|
| 2,333,057 | 10/1943 | Travilla et al. | 105—224 |
| 2,862,459 | 12/1958 | Miller et al. | 105—208 |
| 2,877,719 | 3/1959 | Lich | 105—200 |
| 2,908,230 | 10/1959 | Dean | 105—199 |
| 3,020,857 | 2/1962 | Dean | 105—193 |
| 3,162,275 | 12/1964 | Grossnickle | 105—199 |
| 3,181,479 | 5/1965 | Rumsey et al. | 105—193 |
| 3,244,117 | 4/1966 | Yuhas | 105—96.1 |

ARTHUR L. LA POINT, *Primary Examiner.*

H. BELTRAN, *Assistant Examiner.*